UNITED STATES PATENT OFFICE.

JOHN W. IVERY, OF DILLSBURG, PENNSYLVANIA, ASSIGNOR TO EMANUEL ELLINGER, OF BALTIMORE, MARYLAND.

PROCESS OF TREATING CLAY OR LIKE MATERIAL.

SPECIFICATION forming part of Letters Patent No. 667,222, dated February 5, 1901.

Application filed July 3, 1900. Serial No. 22,450. (No specimens.)

*To all whom it may concern:*

Be it known that I, JOHN W. IVERY, a citizen of the United States, residing at Dillsburg, Pennsylvania, have invented certain new and useful Improvements in Processes of Treating Clay or Like Material, of which the following is a specification.

My invention relates to the washing or refining of clay intended to be used in the manufacture of pottery, tile, or the like. I aim to subject the clay to a simple and cheap but effective process to free it from all grit and foreign matter with but a very small percentage of loss of the clay in the course of the treatment.

In carrying out my improved process I take the clay or similar material to be refined and with this I mix an ingredient or ingredients adapted to cause the suspension of the clay or like material in the wash-water, and I have found that an effective ingredient for this purpose is oil, soap, grease, or a gelatinous ingredient, and I have used soap in the proportion of ten pounds to two tons of clay with very excellent results. Any ingredient may be used to hold the clay in suspension which at the same time will not injure or affect its quality. While the clay is thus held in suspension, the grit and heavier foreign matters are precipitated. The clay in suspension is then drawn or floated off to a tank or vessel, and the clay is then precipitated, preferably by the addition of alum or some ingredient having the same effect, and after the precipitation of the clay the water is drawn off and the purified clay is then dried in any suitable manner.

What I claim is—

The process of purifying clay or like material consisting in mixing with the clay an ingredient or ingredients adapted to cause its suspension in water while the grit and foreign matters are precipitated; drawing or floating off the clay in suspension; precipitating the clay and finally drying the sediment, substantially as described.

In testimony whereof I affix my signature in presence of two witnesses.

JOHN W. IVERY.

Witnesses:
REUBEN S. BALDWIN,
HARRY C. MATHIEU.